United States Patent [19]

Uchida et al.

[11] 4,012,621
[45] Mar. 15, 1977

[54] CONSUMABLE ELECTRODE FOR INITIATING SCARFING

[75] Inventors: Youtaro Uchida; Yoshihiko Asai; Goro Miya, all of Tokai, Japan

[73] Assignee: Nippon Steel Corporation, Tokyo, Japan

[22] Filed: June 24, 1975

[21] Appl. No.: 589,832

Related U.S. Application Data

[62] Division of Ser. No. 494,362, Aug. 2, 1974, Pat. No. 3,915,762.

[30] Foreign Application Priority Data

Aug. 6, 1973 Japan .............................. 48-88177
Aug. 6, 1973 Japan .............................. 48-88176

[52] U.S. Cl. .............................. 219/146; 148/9 C; 219/69 E
[51] Int. Cl.² .............................. B23K 35/368
[58] Field of Search .............................. 148/9, 9 C, 9.5; 219/68, 69 E, 69 R, 137, 145, 146

[56] References Cited

UNITED STATES PATENTS

| | | | |
|---|---|---|---|
| 2,583,068 | 1/1952 | Sullivan et al. | 148/9 C |
| 2,855,337 | 10/1958 | Holub | 148/9 C |
| 3,025,153 | 3/1962 | Cross | 148/9 C |
| 3,646,306 | 2/1972 | Olds | 219/146 X |

Primary Examiner—Arthur T. Grimley
Assistant Examiner—N. D. Herkamp
Attorney, Agent, or Firm—Wenderoth, Lind & Ponack

[57] ABSTRACT

In the method of initiating the scarfing process for removing the surface defects of a steel material as the material to be scarfed is moving relative to the movement of the scarfing machine having a scarfing nozzle, the improvement, which comprises the use of a consumable electrode having a steel sheath filled with an oxygen source material and a combustible material being fed to a scarfing position on said material to be scarfed until the tip of the consumable electrode contacts said position, thereby rapidly heating contact point of the steel material with electrical energy and the heat of oxidation up to the scarfing initiation temperature, and instantaneously starting the scarfing operation with oxygen jetted from said scarfing nozzle at the position of the steel material heated to such temperature.

4 Claims, 7 Drawing Figures

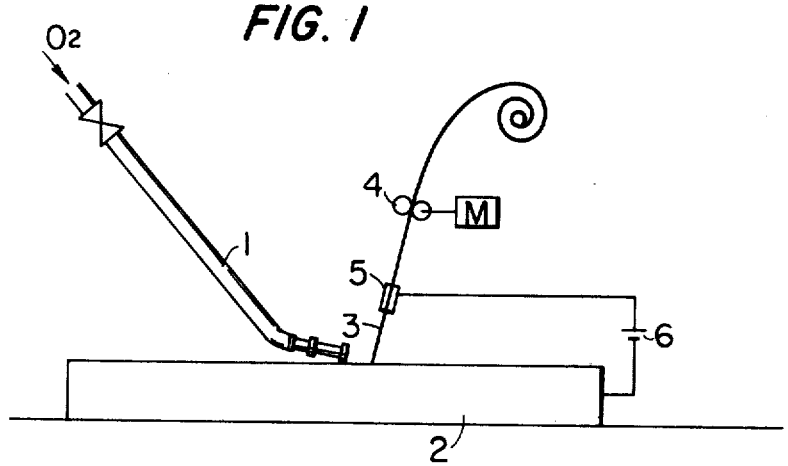
FIG. 1
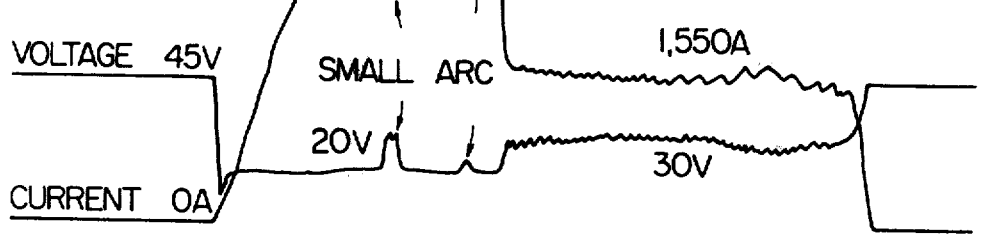
FIG. 2
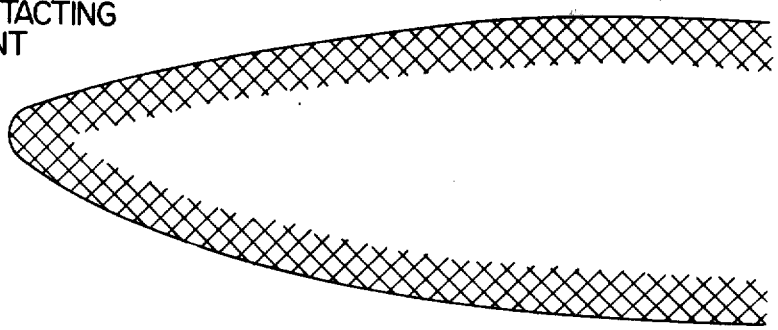

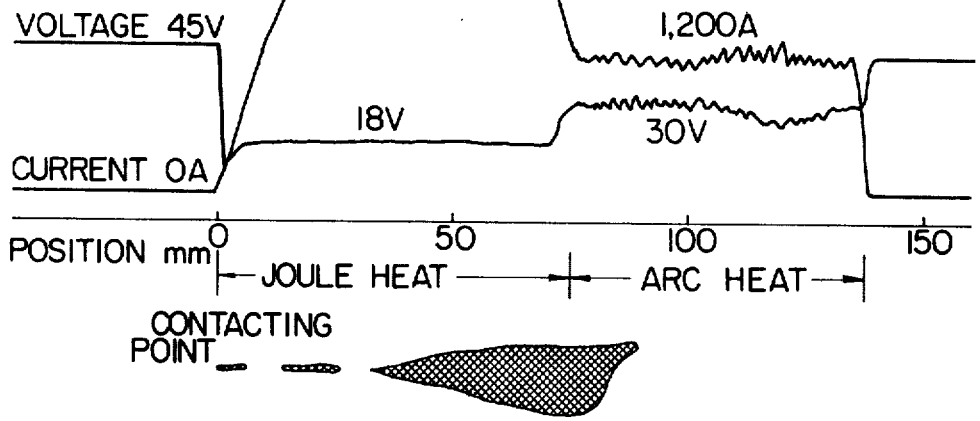
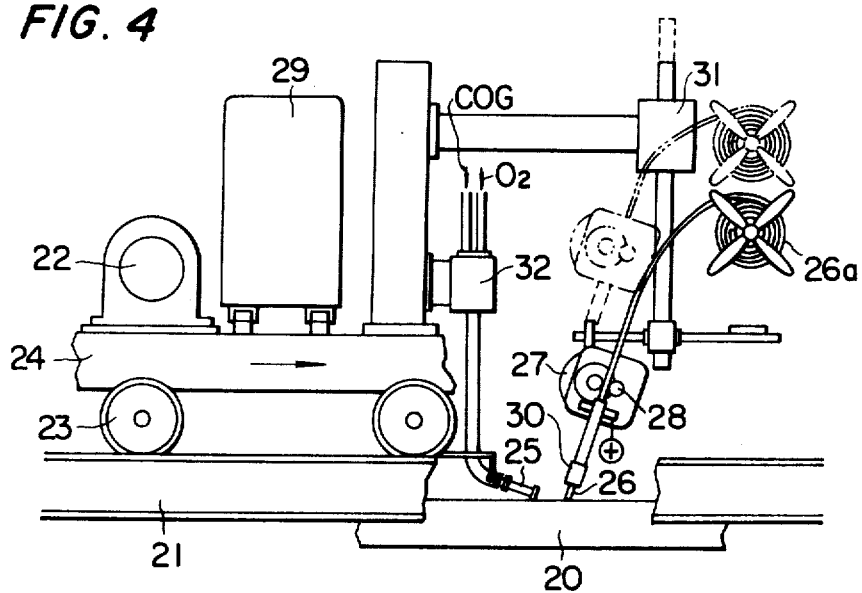
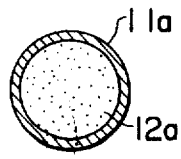
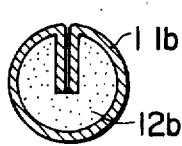
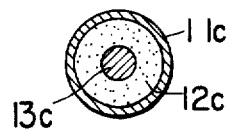

4,012,621

CONSUMABLE ELECTRODE FOR INITIATING SCARFING

The present application is a division of Ser. No. 494,362, filed Aug. 2, 1974, now U.S.P. No. 3,915,762.

BACKGROUND OF THE INVENTION

The present invention relates to a method of instantaneously initiating the scarfing process of to eliminate the surface defects of a steel material, and also to a consumable electrode used for said method. The scarfing equipment is generally used in steel mills and the like for removing the defects on steel products such as slabs, blooms, or billets. The kind of scarfing equipment for treating steel material of high temperature is called a "hot scarfer" which instantaneously starts the scarfing process with high-pressure oxygen jetted from the scarfing nozzle. However, for treating cold material, there must be used a so-called cold scarfer after the scarfing position has been heated up to the temperature, at which oxidation may be used to scarf the steel.

Usually in the case of scarfing cold material, the scarfing position must be heated more than 10 seconds. Such a long heating time not only lowers the operation efficiency but also makes it impossible to practice the so-called "flying start of the scarfing operation", according to which the scarfing operation is started as the scarfing machine is moving, or without stopping the movement of the material to be scarfed which factors represent disadvantages in the conventional method of scarfing cold material.

In order to shorten the heating time, the following methods are publicly known:

First, there is known a method of providing in front of the scarfing nozzle, a nozzle for jetting a metal powder such as iron into the pre-heating flames, thereby producing a great volume of heat energy by the combustion of such metal powder with oxygen as well as mechanical energy due to the jetting of such metal powder, which makes for the speedy local heating of the scarfing position. Secondly, there is known a rod of method of feeding a storting small diameter in front of the scarfing nozzle until it contacts the scarfing position, so as to melt the tip of said rod with pre-heating flames issued from the scarfing nozzle which results in the production of molten drops for heating and melting material at the scarfing position.

However, these methods are successful only in shortening the heating time more or less, but not in achieving an instantaneous initiation of the scarfing process. According to the first method, 4 to 5 seconds are required before the start of scarfing operation and according to the second method, 6 to 10 seconds are required. Such lengthy heating times do not make it possible to initiate the so-called in the scarfing operation.

SUMMARY OF THE INVENTION

In order to eliminate the aforementioned problems in the conventional methods of initiating the scarfing process, the present invention provides as an object, a method of initiating the scarfing process instantaneously, preferably in less than 1 second, thereby making possible to achieve a so-called flying start in the scarfing operation of such high velocity as is impossible according to the conventional methods.

Another object of the present invention is to provide a method of initiating the scarfing process exactly, making it possible to scarf the surface defects of steel material very efficiently.

A further object of the present invention is to provide a consumable electrode suited for the practice of the above mentioned method.

The above mentioned and other objects of the present invention will appear more clearly from the detailed explanation and embodiments which are mentioned below.

In order to achieve the abovementioned objects, the method of the present invention initiates initiate the scarfing process of the material to be scarfed as said material is moving relative to the movement of the scarfing machine having a scarfing nozzle, feeding an consumable electrode made of a steel sheath containing a oxygen source material and a combustible material toward a scarfing position on said material to be scarfed until its tip contacts said position, rapidly heating the point on said material in contact with said electrode with electrical energy the heat of oxidation up to the scarfing initiation temperature, and instantaneously starting the scarfing operation with oxygen jetted from said scarfing nozzle from the position heated to such temperature.

Also, the consumable electrode of the present invention which is suited for the practice of the abovementioned method of initiating the scarfing process, comprises a steel sheath containing a powder mixture of an oxygen source material of 5 to 50% by weight and the remainder being iron powder as the combustible material.

BRIEF DESCRIPTION OF THE DRAWINGS

FIG. 1 is an illustration of the principle of the present invention.

FIG. 2 is a schematic representation of the change of the potential between the electrode and the slab, the change of current and the shape of the area to be scarfed on the steel slab, in case the scarfing process is initiated by using the consumable electrode of the present invention.

FIG. 3 is a schematic representation of the change of the potential between the electrode and the slab, the change of amperage, and the shape of the area to the scarfed area on the steel slab, in case the scarfing process is initiated under the same conditions as in the case of FIG. 2 but an electrode made of steel wire is used.

FIG. 4 is a side view of an embodiment of the scarfing machine for practicing the scarfing initiation method of the present invention FIGS. 5 (a), (b) and (c) are cross-sectional views respectively of embodiments of the consumable electrode for the scarfing initiation method of the present invention.

DESCRIPTION OF THE PREFERRED EMBODIMENT

The following is a detailed explanation of the method of initiating the scarfing process of the material to be scarfed according to the present invention, how it is applied to a steel slab, i.e., the material to be scarfed, which is standing still, while the scarfing machine is running.

Referring to FIG. 1 which explains the principle of the present invention, 1 denotes a scarfing nozzle which is mounted on the scarfing machine (not shown) running along slab 2, and the rear end of which is connected with an oxygen supplying pipe and a mixed gas supplying pipe. 3 denotes a consumable electrode provided opposite to said scarfing nozzle 2 and pointing to a scarfing position (the position at which the center of the scarfing nozzle crosses the surface of the slab). Said electrode 3 is fed to the scarfing point by means of feeding rollers 4 provided on the scarfing machine. Said electrode is sheathed with a steel shell and fluid with a powdery mixture of such an oxygen source material as iron oxide and of a combustible material such as iron powder occasionally added with aluminum powder. 5 denotes a electricity supplying tip provided near the tip of the consumable electrode 3. 6 denotes an electric source connected with said electrical supplying tip 5 and the steel slab 2.

When the scarfing nozzle 1, approaches a selected scarfing position, as it is jetting oxygen, electricity is switched on to the electrode 3 and the steel slab 2, and the feeding rollers 4 are motivated to feed the electrode 3 to the scarfing position. When the tip of the electrode 3 contacts the scarfing position on the surface of the steel slab 2, there is produced a short-circuit current, which produces what is known as joule heat (contact resistance heat) for rapidly heating the tip of the electrode and the contact point on slab 3 in joint effect with the heat of oxidation (mentioned below), thereby completing the initiation of the scarfing process, that is, forming the scarfing starting zone where the scarfing operation being. When the tip of the electrode 3 is molten, an arc is produced between the electrode 3 and the steel slab 2, which promotes the heating of the scarfing starting zone and the melting of the electrode. Thus, molten drops fall over the scarfing starting zone, helping extend the width of the zone extend on.

At the same time, with the heating of the contacting part with electrical energy produced by the Joule effects and arc effect, the oxygen source material such as iron oxide contained in the electrode is heated to a high temperature with Joule heat or arc heat, and dissolves so as to generate nascent oxygen; and the combustible material such as iron powder contained in the electrode 3 is also heated in the same manner as mentioned above, so as to react with the said oxygen, therefore rapidly the heat of oxidation. The addition of aluminum powder will make the volume of oxidation heat even greater.

As the electrical energy consisting of the Joule heat and arc heat joins with the heat of oxidation, the scarfing position is heated instantaneously up to the scarfing initiation temperature (more than 1,325° C), and the electrode 3 is molten in a greater amount. As a result, it is possible to instantaneously start the scarfing operation with oxygen jetted from the scarfing nozzle 1 from the point which has been heated to the scarfing initiation temperature. As for the initiation of the scarfing process, (the scarfing initiation), it continues until the scarfing initiating zone is extended to the desired width at the completion of the scarfing start. Upon completion of the scarfing start, the electrode 3 is lifted back.

By the way, it is possible according to the present invention to make a flying start only with Joule heat as the electrical energy, in combination the heat of oxidation.

As mentioned above, the heating of the scarfing position with electrical energy jointly with the heat of oxidation is so rapid that the time from the first contact of the electrode 3 to the scarfing position to the completion of the scarfing initiation is as short as 0.2 to 0.8 second, that is, almost instantly, making it possible to perform a precise scarfing operation even as the scarfing machine is running, which instantaneous flying start heating is known as the of the scarfing operation.

Referring to FIG. 2, there are shown, the change of the potential between the electrode and the steel slab, the change of current, and the shape of area to be scarfed in terms of the horizontal axis of the distances of the respective points on the area to be scarfed from the contacting point between the electrode and the material to be scarfed.

As shown in this figure, potential falls at the contacting point from no-load voltage to contacting resistance voltage, while current rises there rapidly, that is, to 2,250A maximum in 0.15 second. Thus, the heating of the contacting point according to the present invention is made by Joule heat produced by great amperage of current, jointly with the heat of oxidation of the combustible material with oxygen source material both contained in the electrode, instantaneously completing the scarfing initiation; and as the tip of the electrode is molten, an is produced to generate arc heat. Such heat of oxidation and arc heat promote the production of molten drops. Such molten drops fall over the scarfing initiation zone, so as to supply heat until the scarf initiazed zone is extended to the desired width.

In comparison between FIG. 2 and FIG. 3, the latter shows the scarfing start under the same conditions as in FIG. 2 but with the electrode made of steel wire of a conventional type, The wavy forms of voltage and amerage are nearly equivalent, but the scarfing operation in the case of FIG. 3 can not continue because there is no joint effect from the heat of oxidation. Moreover, the scarfing operation discontinues, as shown in FIG. 3, because of the shortage of molten drops of the electrode, making a flying start impossible.

According to the present invention, the scarfing initiation is started with Joule heat, then the scarfing initiation is extended by the addition of arc heat. The scarfing process may proceed without the addition of arc heat, if the scarfing speed is slow, e.g. 10 m/min. As shown in FIG. 2, during the period of heating with Joule heat, there has already been produced a small arc. This arc, however, does not matter if Joule heat works as the main heat source. As for the feeding method of the electrode according to the present invention, a DC motor is usually used. According to the present invention, the electrode feeding speed is controlled on the detection of the voltage between the electrode and the steel slab, so as to produce an arc of about 30 V. Therefore, the conversion to the heating with arc heat is made in a very short time after the contact with the steel slab, when an electrode of high melting speed is used.

As for the cross-section of the consumable electrode according to the present invention, refer to FIGS. 5, (a), (b), and (c). FIGS. 5 (a) shows an electrode having the steel sheath 11a made of round pipe filled with a mixture 12a of an oxygen source material and a combustible material. FIG. 5 b shows an electrode whose steel sheath 11b is made up of a shell with both ends rolled in, and filled with a mixture 12b of a peroxide and a combustible material. FIG. 5 (c) shows an electrode having the steel sheath 11c filled with a mixture 12x of a peroxide and a combustible material and, containing, at the center, a steel core wire 13c. According to the present invention, the feeding of a consumable electrode is preferred to be made so that the consumable electrode which has been made into a long wire wound on a spool into a coil for stock is supplied continuously as it is consumed by uncoiling it from the spool. For this purpose, the shell can better be made of a mild steel, and the mixture of an oxygen source material and a combustible material should be filled so tightly as to prevent it from sliding off of the sheath. The best outside diameter of such an electrode is 2 to 5 mm.

The following is an explanation of the composition of a peroxide and a combustible material needed to fill the consumable electrode for the scarfing initiation method of the present invention.

Most preferable as the peroxide oxygen source of the hematite ($Fe_2O_3$) or are magivetite ($Fe_3O_4$) and part of the abovementioned materials can be substituted by one or more of peroxide such as $BaO_2$, perchlorate such as $KClO_4$ and permanganate such as $KMnO_4$. As the combustible material, iron powder is preferred and aluminum powder can be added thereto, so as to promote the production of oxidation heat. The following table discloses the relationship between the composition of the respective materials and the time from the contact of the electrode to the completion of scarfing initiation:

Table 1

| No. | Composition (wt %) | | | Time from electrode contact to completion of scarfing initiation (second) |
|---|---|---|---|---|
| | Iron oxide power | Al powder | Fe powder | |
| 1 | 3 | — | 97 | 1.5 |
| 2 | 5 | — | 95 | 0.8 |
| 3 | 10 | — | 90 | 0.4 |
| 4 | 20 | — | 80 | 0.3 |
| 5 | 40 | — | 60 | 0.3 |
| 6 | 50 | — | 50 | 0.6 |
| 7 | 60 | — | 40 | 1.2 |
| 8 | 20 | 5 | 75 | 0.2 |
| 9 | 20 | 10 | 70 | 0.3 |
| 10 | 20 | 15 | 65 | 2.0 |
| 11 | — | — | — | 3.0 |
| 12 | 40 | — | 60 | 0.4 |

Remarks Case No. 12 used only Joule heat as the electrical energy.

Referring to the above table, Cases Nos. 2 to 6, 8, 9 and 12 represent the scarfing initiation which can be completed within one second. This provides that the content of iron oxide should be more than 50%. An iron oxide content of less than 5% results is a short supply of oxygen source, that is, short production of oxidation heat, while a content of more than 50% brings about an imbalance with the content of iron powder, also resulting in short production of oxidation heat. The shortage of oxidation heat requires longer time before the of scarfing initiation can be completed, i.e. before the start of scarfing operation.

The addition of aluminum powder in an appropriate quantity as in Case Nos. 8 and 9, promotes the production of oxidation heat, making the start of the scarfing operation easier or, more specifically, making it possible to start the scarfing operation in 0.2 second.

However, if more than 10% aluminum powder is added, $Al_2O_3$ forms in a greater quantity, making it difficult to start the scarfing operation. See, for example, Case No. 10, where the aluminum powder content of 15% resulted in the requirement of as much as 2 seconds before the start of scarfing operation. Thus, it is necessary to restrict the addition of aluminum powder to less than 10%. As substances for promoting the production of oxidation heat, magnesium and calcium are effective, if added in a small quantity.

The proportion by weight between the total filler (the mixture of an oxygen source material and a combustible material) and the total weight of the electrode should be more than 5%. If the weight proportion is less than 5%, short production of oxidation heat will occur because of the shortage of oxygen source material and combustible material.

As mentioned above, the use of the electrode filled with the so(-)prescribed filler makes possible to start the scarfing operation within one second from the contact time of the electrode with the material to be scarfed even in 0.2 second if the optimum prescription is used. If such efficient equipment, as mentioned above, is mechanically set on the running truck, it will be possible to start the scarfing operation even while it is running at a speed of more than 10m/min. Moreover, according to the present invention, the electrode can be made into the form of wire wound into a coil, therefore, it can be supplied continuously by uncoiling from the coil, as it is consumed, so it can be used for longer periods of time without refilling.

FIG. 4 shows an embodiment of the self-running scarfing machine for the practice of the method of the present invention. A self-running truck 24 runs on wheels 23 along rails 21, as it is motivated by a motor 22, as if it bridged over a steel slab 20. On said truck 24, there are mounted a scarfing nozzle 25, an electrode wire 26 filled with an oxygen source material and a combustible material for scarfing initiation and their accessories. The scarfing nozzzle 25 has its tip set slant at a certain angle against the scarfing surface and the direction of progress, on a holding member 32 of the truck 24 for free vertical movement. Also, its rear end is connected with the sources of oxygen and fuel supply. The electrode wire 26 is fed from the coil 26a on the electrode feeding motor 27 to the scarfing position through the feeding rollers 28. Current supply to said wire 26 is made from an electrical power source 29 mounted on the truck 24 through a guide and an electricity supply tip 30. On the other hand, the steel slab 20 is connected with another terminal of said power source 29.

The tip of said electrode wire 26 contacts the surface of the steel slab 20 for scarfing initiation, but should be lifted back immediately after the completion of scarfing. It may be advisable to have a apparatus which suspends the electrode wire and its accessories as a whole suspended for free vertical movement by means of an oil pressure device 31. Instead of using the self-running type truck for the movement of the scarfing equipment, the same operational effects can be obtained by the movement of the steel slab 20 by such means as a roller table. As for the supply method of a consumable electrode, the continuous supply from a coil is not the only method. It may be possible to supply straight electrode bars of a certain length one after another.

In the case of scarfing the steel slab by using the equipment of FIG. 4, move the scarfing machine over the steel slab 20, and feed the electrode wire 26 by means of the motor 27 to the scarfing position and switch on the electrical source 29 to introduce current to said electrode wire 26 through the electricity supplying tip 30 right when the equipment comes over the area to be scarfed.

As for the temperature rise at the scarfing point and the melting of the electrode, refer to the explanation of FIG. 1. The initiation of the scarfing process is completed instantaneously in this case too. After the completion of the scarfing start, motivate the oil pressure device 31 to lift back the electrode wire 26 as shown by the broken FIG. 4, in so as not to hinder the scarfing operation. In FIG. 4, only one scarfing nozzle is shown, but it is also possible to use a plurality of scarfing nozzle each having an electrode of the present invention for simultaneously starting the scarfing operation.

EXAMPLE

Scarfing equipment: Self-running scarfer as shown in FIG. 4.
Scarfing speed: 15 m/min.
Size of area to be scarfed: 80 mm wide × 1 m long (partial scarfing)
Oxygen pressure at scarfing nozzle: 6 kg/cm$^2$
Protection flame: GOG flame
Electrode wire used: 3.2%
Combustible material: 20% for Case No. 4, Table 1; cross-section of wire: See FIG. 5 (a)
Electric power source for starting the scarfing process:
DC current 3000 A max.; wire plus As the abovementioned conditions were used, the initiation of the scarfing process was completed 0.3 second after the contact of the electrode with the material to be scarfed, making it possible to do the scarfing operation as the scarfer was running.

When using the electrode wire and the composition of Case No. 8, Table 1, and under the same conditions as mentioned above, the initiation of the scarfing process was completed 0.2 second after the contact of the electrode, where the scarfing operation could proceed very smoothly with the scarfer running.

We claim:

1. A consumable electrode used for a scarfing initiation method, which consists essentially of a steel sheath filled up with a powdery mixture weighing more than 5% of the total weight of said electrode, said powdery mixture consisting of a metallic oxygen source material in amounts of 5 to 50% by weight and of a combustible material consisting mainly of iron powder as the remainder of the mixture.

2. The consumable electrode claimed in claim 1, wherein the powdery mixture is made up of iron oxide as the oxygen source material and iron powder as the combustible material.

3. The consumable electrode claimed in claim 1, wherein the powdery mixture is made up of iron oxide as the oxygen source material and iron powder together and aluminum powder of less than 10% by weight of the powdery mixture as the combustible material.

4. The consumable electrode of claim 1, wherein the powdery mixture consists of, as the oxygen source material, iron oxide as the main ingredient together with one or more materials selected from the group consisting of BaO$_2$, KClO$_4$ and KMnO$_4$ and as the combustible material iron powder as the main ingredient together with one or more materials selected from the group consisting of Al, Mg and Ca.

* * * * *